Figure 1:
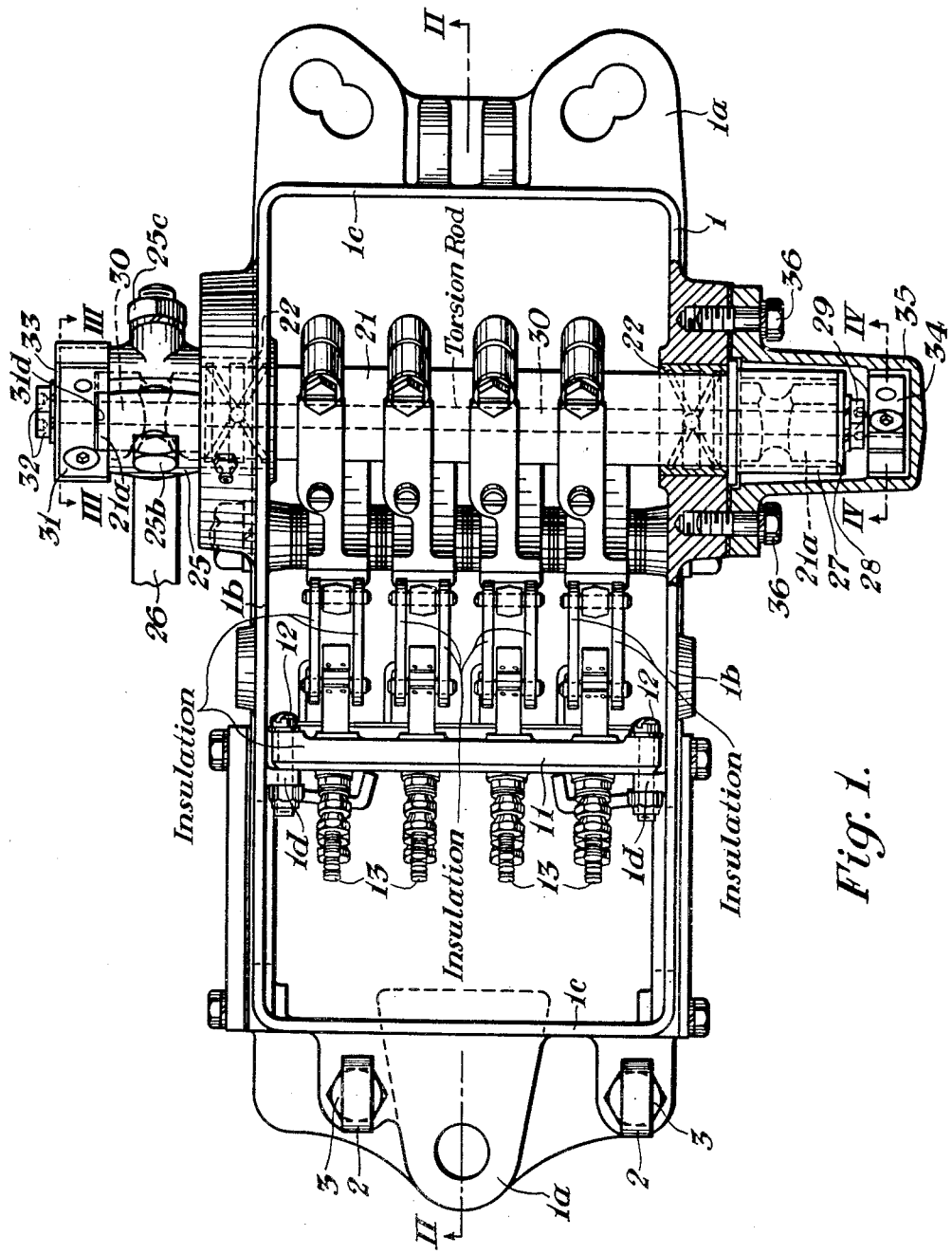

INVENTORS.
Herbert L. Bone and
Glen V. Jefferson
BY
THEIR ATTORNEY

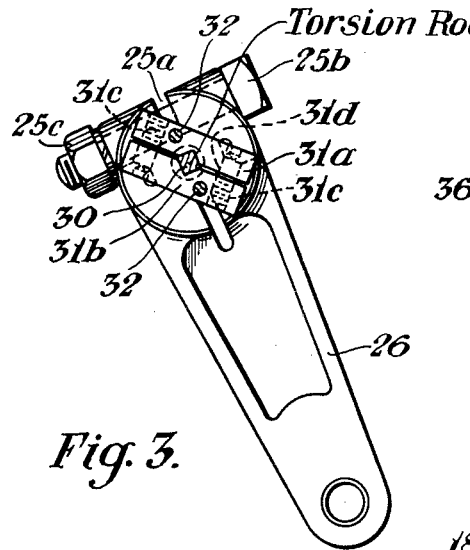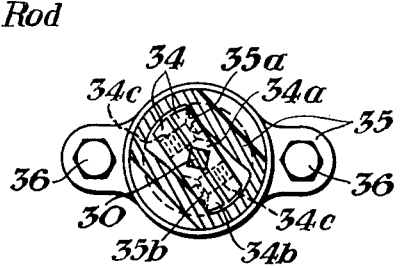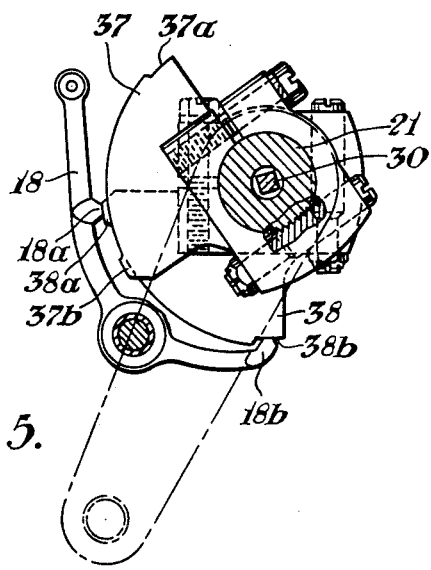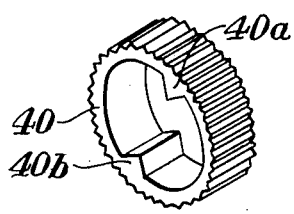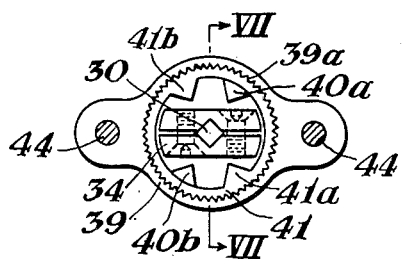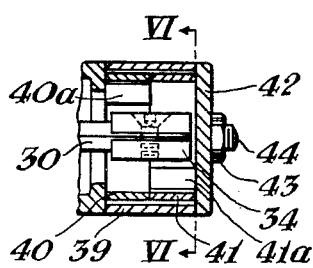
INVENTORS.
Herbert L. Bone and
Glen V. Jefferson
BY
THEIR ATTORNEY Patented Nov. 20, 1951

2,575,994

UNITED STATES PATENT OFFICE 2,575,994

CONTROL SWITCH

Herbert L. Bone, Forest Hills, and Glen V. Jefferson, Edgewood, Pa., assignors to Westinghouse Air Brake Company, a corporation of Pennsylvania Application January 13, 1948, Serial No. 1,955

3 Claims. (Cl. 200—18)

1

This invention relates to control apparatus, and particularly to apparatus including a control device operable between an active position and a safe position and having means for moving the device to its safe position upon any failure of the mechanism which operates the device.

Our invention is illustrated herein as applied to an electrical circuit controller adapted for use in connection with a railway switch operating mechanism. Our invention has features of especial utility in connection with such a circuit controller. Other features, however, are of general utility, and are not necessarily limited to use in connection with an electrical circuit controller.

Electrical circuit controllers of the type described herein are usually mounted on railway ties adjacent a track switch, where they are subject to extreme conditions of vibration. The controller is connected to the switch operating mechanism, and is required to open and close one or more electrical contacts in accordance with the position of the track switch. The usual arrangement calls for the controller to close one set of contacts when the track switch is completely moved to its normal operating position, and to open those contacts whenever the track switch moves away from that position.

Provision may also be made for a second set of contacts to be closed when the switch is in its reverse position. In such an arrangement, any position of the track switch between its two extreme positions represents an unsafe condition in that a train operating over a switch in such a condition may become derailed. Accordingly, the electrical circuit controller opens and closes its associated circuits so as to set the railway signals controlling operation over the switch to stop whenever the switch is moving between its opposite extreme positions.

It is desirable for reasons of safety that a circuit controller of the type described operate its contacts to indicate an unsafe condition whenever the linkage connecting the circuit controller to the switch operating mechanism fails.

It is also desirable that a circuit controller of the type described be very sensitive to all movements of the points of the track switch, so as to give an unsafe indication in case the switch points are only slightly open, as for example, when they are prevented from closing completely by some obstruction. It is also necessary, because of the extreme vibration conditions encountered, that the contacts of the circuit controller be moved forcibly into engagement and held there with a high contact pressure.

2

It is therefore an object of our invention to provide an improved electrical circuit controller which is very sensitive, and which closes its contacts with high contact pressure.

Another object is to provide improved spring biasing means for use in connection with a control device operable between a safe position and an active position, the spring biasing means being effective upon failure of the device operating mechanism to return the control device to its safe position.

A further object of our invention is to provide an improved circuit controller which is readily adaptable to either left-hand or right-hand operation.

A further object of our invention is to provide an improved weatherproof casing, including a cover with improved hinge and lock structures, whereby the cover may be tightly fastened to the casing.

In the form of our invention disclosed herein, we accomplish these objects by operating the contacts through cams having steep rise portions cooperating with hardened steel slider follower structures which insure rapid contact movement and high contact pressure. Such cam and follower structures involve considerable operating and frictional forces. If such contacts are to be operated to their safe positions by a spring, then a heavy spring is required. In our construction, the cams are mounted on a hollow shaft. A heavy torsion bar spring extends through the hollow shaft. One end of the spring is connected to the shaft, and means is provided for limiting the rotary movement of the opposite end of the torsion bar. As the shaft is rotated so that the cams move their contacts to their circuit-controlling positions which indicate that the track switch is in proper position for a train movement, then the free end of the torsion bar is restrained from movement, so that the bar is twisted by that rotation of the shaft. Then if the controller operating linkage becomes broken or fails for any reason, the torsion bar is effective to move the shaft and its contact operating cams to a position in which the contacts are effective to indicate an unsafe condition of the switch.

In one modification of our invention disclosed herein, we provide means for adjusting the spring biasing means so as to vary the angular position of the camshaft at which the biasing means takes effect. This is done by providing a movable stop structure clamped on the end of the torsion bar and a cooperating stationary stop structure mounted so that its angular position may be changed readily.

We mount the electrical parts of our controller in a weatherproof casing. The cam operating shaft extends through the casing and projects from its opposite sides. A crank for rotating the shaft is attached to one of its projecting ends, and the stop structure which limits the movement of the torsion rod is attached to the casing and encloses the other end of the shaft. The parts associated with the opposite ends of the shaft are made interchangeable, so that the controller may be operated through linkage located on either side of the casing.

Our weatherproof casing has a hinged cover. The hinge is adjustably mounted with respect to the casing. We provide an improved cam locking mechanism for the cover which is also adjustable. The cover, hinge, and cam locking mechanism are so constructed that all parts are placed under tension when the cover is closed and locked, thereby insuring tight closure of the casing.

Other objects and characteristic features of our invention will become apparent as the description proceeds.

We shall describe one form of circuit controller embodying our invention and modified forms of certain parts of the controller, and shall then point out the novel features thereof in claims.

Figure 2:
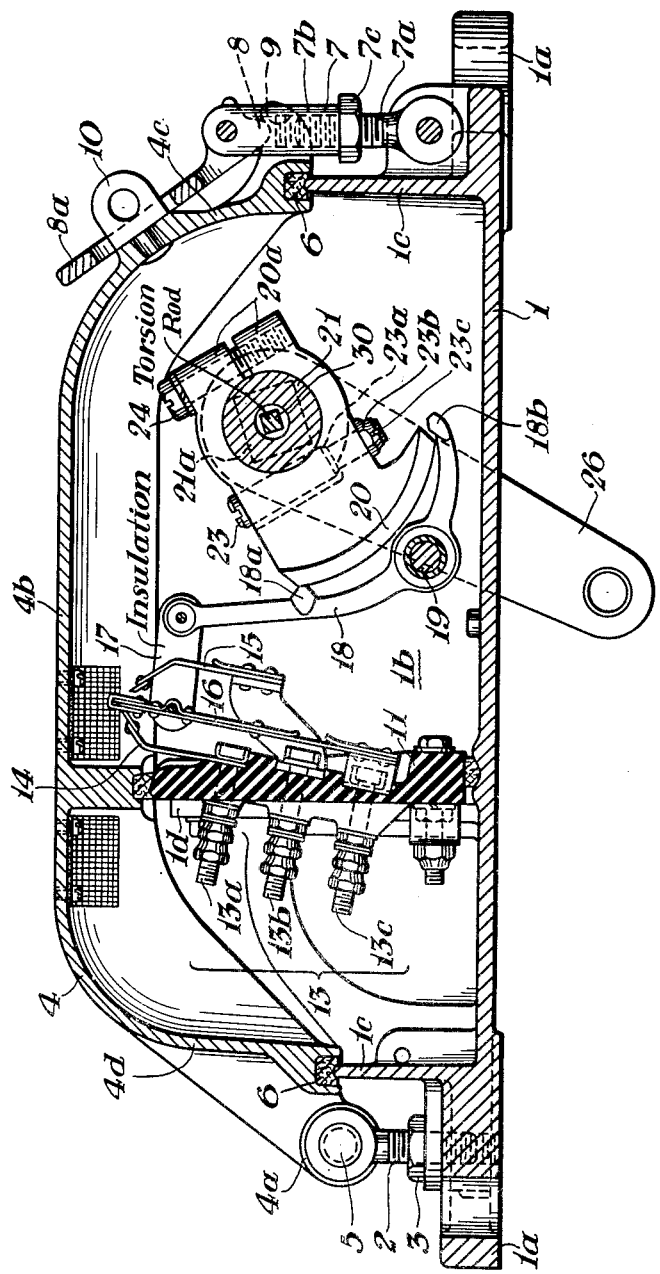

In the drawings, Fig. 1 is a plan view, with the cover removed, of an electrical circuit controller embodying our invention. Fig. 2 is a cross sectional view taken along the line II—II of Fig. 1, with the cover of the circuit controller in place. Fig. 3 is a cross sectional view of the camshaft and spring biasing mechanism of Fig. 2, with certain parts removed, taken along the line III—III of Fig. 1, looking in the direction of the arrows. Fig. 4 is a similar cross sectional view, taken along the line IV—IV of Fig. 1, looking in the direction of the arrows. Fig. 5 is a cross sectional view of a cam construction which may be used in place of the cam construction of Fig. 2. Fig. 6 is a cross sectional view similar to Fig. 4, showing a modified form of stop mechanism for the biasing spring, taken along the line VI—VI of Fig. 7. Fig. 7 is a cross sectional view taken along the line VII—VII of Fig. 6. Fig. 8 is an isometric view of a splined stop member 40.

In the drawings, there is shown a casing 1 having feet 1a adapted to support it on railway ties. A pair of eye bolts 2 are threadedly inserted in the feet 1a at one end of the casing. Lock nuts 3 are provided to hold the eye bolts in any position to which they may be adjusted. A cover 4 is provided for the casing 1. Integrally formed in the cover 4 are a pair of eyes 4a, arranged for alignment with the eyes in the eye bolts 2. A pin 5 passes through each of the eye bolts and its associated eye 4a. The pins 5 serve as pivots on which the cover 4 is hinged. The pins 5 may be held in place by suitable means, not shown, as for example, cotter pins.

The side walls 1b of the casing 1 are higher than the end walls 1c. The cover 4 is provided with a high center portion 4b and lower end portions 4c and 4d, so that it conforms to the contour of casing 1. The periphery of the cover 4 is recessed to receive a resilient packing 6, which engages the edge of the casing 1. The eyes 4a are attached to the lowend portion 4d of the cover 4.

On the end of the casing 1 opposite the hinge pins 5 is pivotally mounted a link 7 of adjustable length. The link 7 consists of an eye bolt 7a pivotally mounted on the casing 1, an internally threaded socket member 7b which threadedly engages the eye bolt, and a lock nut 7c, which holds the socket member 7b in its adjusted position on the eye bolt 7a.

A rotary cam element 8 is pivotally mounted on the free end of link 7. It cooperates with a fixed cam element 9 formed in the end of cover 4. The rotary cam element 8 is elongated at 8a to form a hasp which fits over a staple 10 mounted on the cover 4. The staple 10 is adapted to receive the bail of a padlock (not shown).

The structures of the camlock mechanism, the cover, the casing, and the hinge mechanism are such that when the cover is closed and the cam mechanism locked as shown in the drawings, the link 7, the cover 4, and the eye bolts 2 are all placed under tension. This takes up all lost motion in the hinge and lock structures, and thereby reduces wear which might otherwise occur at the hinge pins 5 due to the excessive vibration to which the controller is subjected. The length of the link 7 may be adjusted, and the height of the hinge pins 5 may be adjusted to compensate for wear of the packing 6.

A terminal board 11, of insulating material, is mounted on ribs 1d formed on the inside of the walls of casing 1. The terminal board 11 is mounted on the ribs 1d by mounting bolts 12, and carries four sets of terminals 13. Each set comprises three terminals, 13a, 13b, and 13c. These terminals extend through the terminal board 11, and on its opposite side are attached respectively to a stationary contact 14, a stationary contact 15, and a movable contact 16. These contacts are of the leaf spring type, and are supported at one end on the terminals 13. The free end of movable contact 16 lies between the free ends of stationary contacts 14 and 15, and is connected by a link 17 to a rocker arm 18 pivotally mounted on a rockshaft 19. The rocker arm 18 carries a pair of hardened steel cam followers 18a and 18b, which cooperate with a cam 20 adjustably mounted on a camshaft 21, which rotates in bushings 22 in the opposite side walls of the casing 1.

The mechanism for adjusting the angular position of cam 20 with respect to shaft 21 includes an adjusting screw 23 and a locking screw 24. The locking screw 24 passes freely through a smooth hole in one part of a split portion 20a of cam 20, and threadedly engages the other part. The screw 23 cooperates with a thread cut in the surface of the camshaft 21. Screw 23 has portions of different diameters separated by a shoulder 23a. The hole through which screw 23 passes likewise has portions of different diameters forming a shoulder with which the shoulder 23a on the screw may cooperate. The narrow portion of screw 23 is threaded to engage a lock nut 23b. Lock nut 23b is held on screw 23 by a cotter pin 23c. The nut 23b is adjusted so as to give the screw 23 a slight end play in the cam 20. When it is desired to adjust the cam 20 on the shaft 21, the locking screw 24 is loosened, and the screw 23 is then rotated, and thus moves circumferentially of the threaded portion of shaft 21. This turns the cam 20 either by virtue of the engagement of the lock nut 23b with the cam or by virtue of the engagement of shoulder 23a with the corresponding shoulder in the screw hole, depending upon the direction of rotation of cam 20. After the adjustment is completed, the locking screw 24 is tightened to clamp the split portion of the cam 20 tightly against the shaft 21.

The camshaft 21 extends outside the casing 1 substantially equal amounts on the opposite sides of the casing. The outside ends of the shaft 21 are squared, as indicated at 21a. Mounted on one of the squared portions 21a is a split hub 25, to which is attached a crank arm 26 for rotating the shaft 21. The corresponding squared portion 21a on the other end of the shaft is covered by a spacer sleeve 27, held in place by means of a plate 28 and screws 29 which extend through the plate 28 and engage threaded holes in the end of the shaft.

As previously stated, the shaft 21 is hollow. A torsion spring rod 30 extends through the hollow shaft from end to end, and projects beyond the ends of the hollow shaft. The spring rod 30 is shown in the drawings as being of square cross section, although any suitable configuration or rod may be used.

The end of shaft 21 on which the hub 25 is mounted is attached to the adjacent end of the torsion rod 30 by means of a split clamp 31. The split clamp 31 (see Fig. 3) comprises a pair of opposed pieces 31a and 31b held together by means of screws 31c. The pieces 31a and 31b are provided with opposed central V-shaped recesses which receive the square torsion rod 30 when the two pieces are tightened together. The inner faces of the clamp pieces 31a and 31b are formed with squared recesses 31d which fit over the end of the square portion 21a of camshaft 21. Screws 32 fasten a channel-shaped cover plate 33 over the clamp 31 and the torsion rod 30. These screws 32 extend through the clamp 31 and engage threaded holes in the end of shaft 21, similar to those engaged by screws 29 at the other end of the shaft. The cover plate 33 (which is omitted from Fig. 3 for reasons of clarity) is made channel-shaped to enclose the space between the clamp pieces 31a and 31b, and thereby prevents entry of dirt into the hollow shaft 21.

The hub 25 is split as shown at 25a and is clamped on the shaft 21 by means of a bolt 25b and a nut 25c.

The other end of the torsion rod 30 is provided with a split clamp 34, shown in detail in Fig. 4. The clamp 34 consists of opposed pieces 34a and 34b held together by screws 34c. The clamp pieces 34a and 34b have opposed central recesses for accommodating the end of torsion rod 30. A cover 35 encloses the clamp 34, and is attached to the casing 1 by means of screws 36. The interior of cover 35 is contoured to provide a pair of opposite stop portions 35a and 35b, which extend into the path of rotation of the opposite sides of clamp 34. When an attempt is made to rotate the torsion rod 30 and the clamp 34 beyond a certain small angle, further rotation of clamp 34 is prevented by the stop portions 35a and 35b.

*Operation*

The various parts are shown in the drawings in the position they assume when the circuit controller is in its active position. The movable contacts 16 are in engagement with the stationary contacts 14, thereby completing an electrical circuit which indicates that the track switch points are in their normal position and that it is safe for a train to proceed over the switch. It should be noted that the split clamp 34 has been rotated against one of its stops, and that the torsion rod 30 has been twisted, so that it is biasing the camshaft 21 for movement in a counterclockwise direction, as viewed in Fig. 4.

If now the track switch is operated toward its reverse position, then the crank 26 is operated to rotate the shaft 21 counterclockwise as viewed in Fig. 2. The cam 20 then lifts the followers 18b and allows the followers 18a to drop, thereby rotating the rocker arms 18 clockwise on the shaft 19, and operating links 17 to move contacts 16 away from contacts 14 and into engagement with contacts 15. It should be noted that it requires but a very small movement of the cams 20 to complete the movement of contacts 16 from one set of stationary contacts to the other. The controller is therefore very sensitive to movements of the switch points. Engagement of contacts 16 with contacts 15 completes a circuit which indicates that it is unsafe for a train to proceed over the switch, at least if the normal direction of operation of the train through the switch is intended. For example, the circuits may be arranged so that engagement of contacts 16 with contacts 15 shunts the track circuits, thereby causing the signals to indicate "stop."

If, with the parts in the positions shown in the drawings, the linkage connecting the crank 26 to the track switch should become broken, then the torsion rod 30 would be effective to rotate the cams 20 counterclockwise as viewed in Fig. 2, thereby operating the switch contacts in the same manner as if the switch had been moved away from its normal position.

It may therefore be observed that the circuit controller fails in a safe sense. That is, if the connecting linkage becomes broken in any way so that the controller does not indicate the true position of the track switch, then its circuits are closed in a manner to indicate that the track switch is not in its normal position. Adequate warning is thereby given to approaching trains which may then take proper precaution when approaching the track switch.

Because of the use of a quick-acting cam and follower arrangement, it should be apparent that it is necessary for the return spring 30 to be effective only over a very small angle of motion of the camshaft. Any additional twisting of the spring beyond the amount necessary to insure return of the contacts from their active position to their safe position would simply add unnecessary stress to the spring and to the operating parts of the mechanism. Referring to Fig. 4, it may be noted that a substantial range of free motion is provided for the clamp 34 between the stops 35a and 35b.

*Fig. 5*

There is illustrated in Fig. 5 a somewhat different type of controller contact operating cam mechanism, which may be used in place of the two-position cam of Fig. 2. This cam mechanism comprises two separate cams 37 and 38 mounted side by side on the shaft 21. These cams are of the same general construction as cam 20 of Fig. 2, except that their peripheral contours are different. The two cams 37 and 38 operate on the same rocker arm 18. In the position of the cams shown in the drawing, the followers 18a and 18b engage the surfaces 38a and 38b, respectively, on cam 38. These surfaces are contoured to insure that the positions of rocker arm 18 and of the movable contacts are the same as those shown in Fig. 2. As the camshaft 21 is rotated counterclockwise from the extreme position shown in Fig. 5, the rocker arm 18 is rotated a small amount clockwise, just sufficient to move the movable contacts 16 midway between the stationary contacts 14 and 15. When the camshaft 21 reaches the opposite extreme of its range of movement, then the followers 18a and 18b engage the surfaces 37a and 37b, respectively, of cam 37, thereby rotating rocker arm 18 further in a clockwise direction so that the movable contacts 16 engage the stationary contacts 15.

The type of cam mechanism shown in Fig. 5 is used in connection with a railway track switch when it is desired to have a positive indication when the track switch is in either its full normal or full reverse position, and no indication when the switch is in any intermediate position. It may be seen that this structure closes one set of electrical contacts when the track switch is at one end of its range of movement and another set of contacts when the track switch is at the opposite end of its range of movement.

When a three-position cam such as that shown in Fig. 5 is used, the torsion spring rod 30, clamp 34 and stops 35a and 35b are arranged so the clamp 34 engages the stationary stops just before the cam moves to either of its contact making positions. The final movement of the cam to either contact making position twists the torsion spring rod so that if the operating linkage thereafter fails, the torsion spring will return the cams to a contact-opening position.

Figs. 6, 7 and 8

It is sometimes desirable to be able to adjust the angular position of the camshaft 21 at which the clamp 34 engages its associated stop. For example, this may be required in specific instances where the track layout demands that the crank on the camshaft be moved through either a smaller or larger angle than is normally encountered. We have illustrated one suitable type of mechanism for adjusting the position of the stationary stops in Figs. 6 and 7.

Referring to Figs. 6, 7 and 8, it may be seen that the clamp 34 is enclosed within a sleeve 39 provided with internal serrations or splines 39a. Within the sleeve 39 are received a pair of externally splined stop rings 40 and 41. Each of the rings 40 and 41 is provided with a pair of diametrically opposite stops 40a, 40b, 41a and 41b corresponding generally to the stops 35a and 35b of Fig. 4. The rings 40 and 41 are held in place within the sleeve 39 by means of a cover 42. The cover 42 and the sleeve 39 are fastened to the casing 1 by means of nuts 43 and bolts 44.

It may readily be seen that by removing the cover 42, the splined rings 40 and 41 may be slipped out of the splines in sleeve 39 and rotated to any angular position desired to secure the required restoring torque. They can then be reinserted in the sleeve 39 and fastened in place with the cover 42.

Our circuit controller is also readily adaptable for installations where no return spring is required. In such an event, the return spring 30 and the clamp 34 may be removed, the other parts remaining as shown. The removal of these parts does not affect the interchangeability of the elements at opposite ends of the camshaft 21, so that the controller is still adaptable for either right or left-hand operation.

Although we have herein shown and described only certain particular forms of electrical circuit controllers embodying our invention, it is understood that various changes and modifications may be made therein within the scope of the appended claims without departing from the spirit and scope of our invention.

Having thus described our invention, what we claim is:

1. Control apparatus comprising a housing, a tubular shaft extending through said housing, a crank mounted on said shaft at one side of said housing and movable between two extreme positions, an electrical circuit controller within said housing, means on said shaft for operating the circuit controller as the shaft is rotated, a torsion rod within said shaft and fixed to the crank end thereof, the other end of said torsion rod extending beyond the other end of said shaft, a stop member fixed to the extending end of said rod, a sleeve encompassing the extending ends of said shaft and rod and the stop member, and fixed externally to said housing; internal splines in said sleeve, an externally splined stop ring received within said sleeve having at least one projection extending into the path of the torsion rod stop member, a removable cover for closing the open end of said sleeve to hold said stop ring in place, the crank end assembly and the stop end assembly of the shaft being interchangeable so that said shaft may be adapted for operation from either side of the housing, said sleeve and stop ring providing means externally of the housing for adjusting the bias of said torsion rod.

2. Control apparatus comprising a housing, a tubular shaft extending through said housing, a crank removably mounted on said shaft at one side of said housing adapted to be moved from an intermediate position to two extreme positions and to be at times held in a selected extreme position, a cam on said shaft within said housing, electrical contacts adapted to be actuated by rotation of said cam; some of said contacts being actuated when the crank is in one extreme position, the remaining contacts being actuated when the crank is in its other extreme position, all of said contacts being unactuated when the crank is in its intermediate position; a torsion rod within said shaft and fixed to the crank end thereof, the other end of said rod extending beyond the other end of said shaft, a stop member fixed to the extending end of said torsion rod, a sleeve encompassing the extending ends of said shaft and rod and the stop member, and fixed externally to said housing, internal splines in said sleeve, an externally splined stop ring received within said sleeve having at least one projection extending into the path of the torsion rod stop member, and a removable cover for closing the open end of said sleeve to hold said stop ring in place, said crank end assembly and stop end assembly of the shaft being interchangeable on the ends of said shaft so that said shaft may be adapted to be operated from either side of the housing, said sleeve and said stop ring providing means externally of said housing for adjusting the bias of said torsion rod so that release of said crank in its extreme positions will cause said torsion rod to move said crank to its intermediate position.

3. Control apparatus comprising a cam follower, electrical contacts adapted to be actuated by said cam follower, a tubular shaft, a torsion rod within said shaft and fixed at one end thereto, limit stops for the other end of said torsion rod, cam means on said shaft having camming surfaces for moving said follower to two extreme positions from an intermediate position; some of said contacts being closed in one of said extreme positions and others of said contacts being closed in the other extreme position, all of said contacts being open when said follower is in its intermediate position; and means for rotating and holding said shaft and said cam means against the bias of said torsion rod to move and hold said cam follower in the two extreme positions, release of said last means permitting the return of said shaft and cam means to a position wherein said cam follower is in its intermediate position to open all of said contacts.

HERBERT L. BONE.
GLEN V. JEFFERSON.

REFERENCES CITED

The following references are of record in the file of this patent:

UNITED STATES PATENTS

| Number | Name | Date |
|---|---|---|
| 1,466,606 | Trageser | Aug. 28, 1923 |
| 1,569,713 | Carr | Jan. 12, 1926 |
| 1,725,635 | Halvorson | Aug. 20, 1929 |
| 1,848,349 | Jefferson | Mar. 8, 1932 |
| 1,997,624 | Bereit | Apr. 16, 1935 |
| 2,083,288 | Bone | June 8, 1937 |
| 2,092,614 | Olley | Sept. 7, 1937 |
| 2,175,562 | Frohlich | Oct. 10, 1939 |
| 2,289,643 | Furnas | July 14, 1942 |

FOREIGN PATENTS

| Number | Country | Date |
|---|---|---|
| 440,554 | Great Britain | Jan. 1, 1936 |
| 450,142 | Great Britain | July 8, 1936 |